United States Patent [19]

Fuzesi et al.

[11] Patent Number: 4,699,932

[45] Date of Patent: Oct. 13, 1987

[54] HALOGENATED-HYDROCARBON BLOWN, OPEN-CELL, POLYURETHANE FOAM AND A COMPOSITION AND METHOD FOR THE FABRICATION THEREOF

[75] Inventors: Stephen Fuzesi, Hamden; Gail H. Clarke, Clinton, both of Conn.

[73] Assignee: Olin Corporation, Cheshire, Conn.

[21] Appl. No.: 907,191

[22] Filed: Sep. 12, 1986

[51] Int. Cl.$^4$ ............................................... C08G 18/14
[52] U.S. Cl. ................................... 521/129; 521/131; 521/167; 521/174; 521/175; 521/177
[58] Field of Search ............... 521/131, 167, 174, 175, 521/177, 129

[56] References Cited

U.S. PATENT DOCUMENTS 3,674,717 7/1972 Fuzesi et al. .................. 260/2.5 AS

*Primary Examiner*—Maurice J. Welsh
*Attorney, Agent, or Firm*—Dale L. Carlson; Thomas P. O'Day

[57] ABSTRACT

The present invention relates generally to open-cell polyurethane foams and, more specifically, to such foams which are halogenated-hydrocarbon blown and are essentially urea-free, together with a composition and method for the fabrication thereof.

18 Claims, No Drawings

HALOGENATED-HYDROCARBON BLOWN, OPEN-CELL, POLYURETHANE FOAM AND A COMPOSITION AND METHOD FOR THE FABRICATION THEREOF

FIELD OF THE INVENTION

The present invention relates generally to open-cell polyurethane foams and, more specifically, to such foams which are halogenated-hydrocarbon blown and are essentially urea-free, together with a composition and method for the fabrication thereof.

BACKGROUND OF THE INVENTION

In the production of polyurethane foams, a polyol is reacted with a polyisocyanate in the presence of a polyurethane catalyst and a blowing agent. It is well established in the art that open-cell foams can be produced using water in the reaction mixture to provide a carbon dioxide blowing agent in situ, whereas closed-cell foams are conventionally produced using a flurocarbon blowing agent. The use of water to provide carbon dioxide blowing in the fabrication of open-cell rigid and/or semi-rigid foams has several disadvantages. First, the water in the system facilitates not only the formation of a carbon dioxide blowing agent, but also urea linkages in the polyurethane foam. The presence of these urea linkages in this urea-modified polyurethane foam generally causes unacceptably high foam friability. Second, water is an expensive method of providing an in situ blowing agent since each mole of water consumes a mole of polyisocyanate to provide the carbon dioxide blowing agent and urea linkages. Polyisocyanate is a costly reactant. Thus, in view of the expense and friability problems associated with this conventional method of fabricating open-cell foams, an alternative to the use of water to generate in situ a carbon dioxide blowing agent would be highly desirable.

There is one publication known to the present inventors which discloses that halogenated hydrocarbons can be used as blowing agents in the production of open-cell polyurethane foams, namely, U.S. Pat. No. 3,674,717. More specifically, the '717 patent discloses the production of open-cell polyurethane foam by reacting a starch-phosphorus-based polyether polyol with an organic polyisocyanate in the presence of a polyurethane-forming catalyst and a blowing (or foaming) agent which can be water, halogenated hydrocarbons, and mixtures thereof. This patent does not disclose or suggest the above-discussed disadvantages associated with blowing agents derived from water and, to the contrary, teaches their use. Moreover, although the phosphate-containing open-cell polyurethane foams made from the phosphate-containing polyols disclosed in the '717 patent are useful for many applications, especially those requiring flame retardancy, the foams do not perform as well as might be desired when used in applications that involve contact with a phosphate-hydrolyzable material such as water. For example, when using open-cell foams fabricated from phosphorus-containing polyols as a filter medium for aqueous liquids or moisture-containing gases, the water in these fluids tends to hydrolyze the phosphate linkages in the backbone of the foam, thereby degrading portions of the foam. Such degradation not only diminishes the filtering capability of the foam, but also deposits phosphate-containing impurities in the filtered fluid, which is clearly counterproductive to the filtration function.

In view of the above, it would be highly desirable to provide an open-cell foam that is not subject to degradation in the presence of phosphate-hydrolyzable media and is essentially urea-free.

SUMMARY OF THE INVENTION

In one aspect, the present invention relates to an essentially water-free composition useful for fabricating an open-cell polyurethane foam comprising:

(a) an ethoxyl end-capped or fully ethoxylated phosphorus-free polyether polyol having an average hydroxyl functionality of between 2 and 8 and containing at least 60 percent of primary hydroxyl groups based upon the total number of hydroxyl groups in said polyol, said polyol having a molecular weight of between about 150 and about 15,000, (b) a polyisocyanate having an isocyanate equivalent weight of between about 80 and about 160, (c) a polyurethane-forming catalyst in a catalytically effective amount or in an amount of zero if said polyol is auto-catalytic, and (d) at least one halogenated hydrocarbon as an essential blowing agent in the composition, said polyol being present in said composition in an amount of between about 0.5 and about 1.2 equivalents of said polyol per equivalent of said polyisocyanate.

In another aspect, the present invention relates to a method of producing an essentially urea-free, open-cell polyurethane foam by reacting an essentially water-free, composition comprising an ethoxyl end-capped or fully ethoxylated, phosphorus-free polyether polyol having an average hydroxyl functionality of between 2 and 8 and containing at least 60 percent of primary hydroxyl groups based upon the hydroxyl functionality in said polyol and a polyisocyanate having an isocyanate equivalent weight of between about 80 and about 160 in the presence of a polyurethane-forming catalyst and, as an essential blowing agent, at least one halogenated hydrocarbon blowing agent.

In still another aspect, the present invention relates to the polyurethane foam produced by the above-described method.

DETAILED DESCRIPTION OF THE INVENTION

The open-cell polyurethane foams fabricated in accordance with the present invention are particularly suited for use as filter media, especially for filtration of fluids containing water or another phosphate-hydrolyzable moiety. Useful foams within the scope of the present invention include those foams having more than 50 percent (preferably more than 75 percent) of open cells based upon the total number of cells in the foam. These foams can be rigid, semi-rigid, or flexible. The foams are prepared from foam formulations that are "essentially water-free". Although it is preferred that no water be present in the foam formulation in order to avoid the formation of urea linkages and the associated friability of the resulting foam, it is to be understood that most foam formulation components contain water as impurities. For this reason, although small amounts of water must be tolerated, any water should be kept to a minimum. Thus, by "essentially water-free" is meant that each foam formulation will contain no more than about 2 weight percent, preferably no more than about 1 weight percent, more preferably no more than about 0.1 weight percent, of water based upon the total foam formulation, which provides a polyurethane foam that is "essentially urea-free". As is well known, one mole of water reacts with one mole of diisocyanate to form one mole of substituted urea. On this basis, as pointed out earlier, any water present has the undesirable effect of consuming a portion of the isocyanate reactants, as well as forming unwanted urea linkages.

The fabrication of the foam requires the preparation of the foam-forming composition of the invention. This is readily accomplished by bringing together the polyisocyanate, the polyol, the catalyst, the blowing agent, and any other additives (as discussed hereinafter), using agitation means sufficient to ensure homogeneity in the resultant mixture. The mixing of the components can be carried out by hand, when operating on a small scale, but is advantageously carried out using the various mixing and dispensing machines conventionally employed in the manufacture of polymer foams; see, for example, Ferrigno "Rigid Plastic Foams", Reinhold Publishing Corporation, New York, 1963.

Immediately after completion of mixing of the components, the foam reaction mix is poured or dispensed directly into the appropriate mold and foaming is allowed to take place in the mold in accordance with procedures well recognized in the art for the molding of polymer foams.

In a preferred embodiment, a "one-shot" method of foam fabrication is employed, whereby the isocyanate-containing stream (commonly referred to as the "A-side") and the polyol-containing and catalyst-containing stream (commonly referred to as the "B-side") are mixed. Each of these streams are preferably liquids in which all of the various additives are preferably soluble, although dispersions utilizing solid components can be employed if desired. In accordance with a more preferred embodiment of the present invention, the B-side contains polyol, blowing agent, and a surfactant to assist in foam cell formation.

A typical "B-side" formulation is prepared by blending:

POLY-G 70-460, (a sucrose-diethanolamine-based ethoxylated polyol), a product of Olin Corporation; 100.0 grams Q2-5125 (a silicone surfactant), a liquid product of Dow Chemical Corporation; 2.0 grams Dimethylethanolamine (catalyst), a product of Air Products; 0.5 grams Fluorocarbon R-11B (a trichloromonofluoro-methane blowing agent), a product of E. I. DuPont de Nemours & Company, Inc.; 45.0 grams After thorough mixing of this blend at room temperature, the blend forms a clear solution having a viscosity of about 100 cps at room temperature.

The polyols which are used in the subject invention are well known in the art and are generally referred to as polyoxyalkylene polyether polyols. These polyols are prepared by the reaction of an alkylene oxide with polyhydric or polyamine-containing compounds, or mixtures thereof. Alkylene oxides which may be employed in the preparation of the polyols of the present invention include ethylene oxide, propylene oxide, butylene oxide, styrene oxide and the like. Halogenated alkylene oxides may also be used such as epichlorohydrin, 3,3,3-trichlorobutylene oxide, etc. Mixtures of any of the above alkylene oxides may also be employed. The preferred alkylene oxide is ethylene oxide.

Polyoxyalkylene polyether polyols generally contain either primary or secondary hydroxyl groups, or mixtures thereof. As stated earlier, the polyol or mixture of polyols employed in the composition of the present invention must have at least 60 percent of primary hydroxyl groups based upon the total number of hydroxyl groups in the polyol or polyol mixture. These polyols are suitably prepared by reacting an active-hydrogen containing compound, such as polyhydric compounds or polyamines, with the above-described alkylene oxides. Useful polyhydric compounds include ethylene glycol, propylene glycol, diethylene glycol, dipropylene glycol, glycerol, pentaerythritol, sorbitol, sucrose, methyl glucoside, glucose, etc. Polyamine compounds which may be reacted with the alkylene oxide to prepare amine-based polyols include mono-, di-, and triethanol amine, ethylene diamine, diethylene diamine, toluene diamine, etc. These polyhydric alcohols and polyamine compounds can be reacted separately with alkylene oxides or they can be pre-mixed in the preparation of polyether polyol mixtures or blends. The preferred polyols are the sucrose amine polyols.

The polyol is employed in a proportion corresponding to between about 0.5 and about 1.2 equivalents per equivalent of polyisocyanate. Preferably, the polyol is employed in a proportion corresponding to between about 0.8 and about 1.0 equivalents per equivalent of polyisocyanate. Below the lower limit of about 0.5 equivalent of polyol per equivalent of polyisocyanate, the resulting foam is expected to be excessively friable. Above the upper limit of about 1.2 equivalents of polyol per equivalent of polyisocyanate, the resulting foam is expected to undergo excessive interior scorching and associated foam cell structure degradation during fabrication due to the increased exotherm of reaction by the additional polyol.

By "equivalents" of polyol is meant the molecular weight divided by the number of hydroxyl groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups (i.e., groups which show a positive reaction when tested by the Zerewitinoff method, J. Am. Chem. Soc., 49, 3181, 1927).

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate, 1,4-diethylbenzene diisocyanate and other di- and higher polyisocyanates such as those listed in the tables of Siefken, Ann. 562, 122–135 (1949). Mixtures of two or more of the above isocyanates can be used, such as mixtures of the 2,4- and 2,6- isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 15° C. and higher using, for example, the processes described in Belgian Pat. No. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Pat. No. 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylenebis(phenyl isocyanate) with polymethylene polyphenyl isocyanates of higher functionality. Such mixtures are generally those obtained by phosgenation or corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared thereform, are known in the art, see, for example, U.S. Pat. Nos. 2,683,730; 2,950,263; 3,012,008 and 3,097,191; Canadian Pat. No. 665,495; and German Pat. No. 1,131,877. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The amount of catalyst employed in the compositions of the present invention is a "catalytically effective" amount, i.e., an amount sufficient to catalyze the reaction of the polyisocyanate and the polyol to form polyurethane linkages.

Due to the high primary hydroxyl content of the polyols used in the formulation for making the open-cell foams of the present invention, the reactivity of the polyol with the isocyanate is fast. Therefore, the foaming process requires only relatively low levels of catalyst. Advantageously, the catalyst is employed in an amount corresponding to no greater than about 5.0 weight percent based on the weight of the total composition. Preferably, the catalyst is a tertiary amine employed in a more preferred amount corresponding to between about 0.5 and about 3.0 weight percent based on the weight of the total composition, although tin catalysts such as dibutyltin dilaurate, or mixtures of amine and tin catalysts are also suitably employed. When using an amine-based polyol, the urethane-forming reaction can be sufficiently auto-catalytic so as to not require the incorporation of a separate catalyst. Indeed, it is preferred not to employ a catalyst with the amine-based polyols in order to minimize the possibility of scorch of the foam. However, when using other types of polyols to fabricate foams, a catalyst is generally preferred.

Useful tertiary amines are those which are generally employed to catalyze the reaction between an isocyanato group and an epoxide group. Such catalysts are a group of compounds well-recognized in the art of synthesizing polyurethanes; see, for example, Saunders et al, *Polyurethanes, Chemistry and Technology*, Part I, pages 228–230, Interscience Publishers, New York, 1964; see also Burkus, J., *Journal of Organic Chemistry*, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo(2-2-2)octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N"-trialkylaminoalkylhexahydrotriazines such as N,N'N"-tris(dimethylaminomethyl)hexahydrotriazine, N,N',N"-tris(dimethylaminoethyl)hexahydrotriazine, N,N',N"-tris(dimethylaminopropyl)hexahydrotriazine, N,N',N"-tris(diethylaminoethyl)hexahydrotriazine, N,N',N"-tris(diethylaminopropyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis(dimethylaminoethyl)phenol, 2,4-bis(dipropylaminobutyl)phenol, 2,4-bis(dipropylaminoethyl)phenol, 2,4-bis(dimethylaminoethyl)thiophenol, 2,4-bis(diethylaminopropyl)thiophenol, 2,4-bis(dipropylaminoethyl)-thiophenol, 2,4,6-tris(dimethylaminoethyl)phenol, 2,4,6-tris(diethylaminoethyl)phenol, 2,4,6-tris(dimethylaminobutyl)phenol, 2,4,6-tris(dipropylaminomethyl)phenol, 2,4,6-tris(diethylaminoethyl)thiophenol, 2,4,6-tris(dimethylaminoethyl)thiophenol and the like; N,N,N',N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The preferred tertiary amine catalysts are dimethylethanolamine (DMEA) and POLYCAT-8 (a product of Abbott Corp.), N,N-dimethylcyclohexyl amine.

If desired, any organometallic compound known to be a catalyst in the reaction between an isocyanato group and an active hydrogen-containing group can be employed in the compositions of the present invention. See, for example, Saunders, ibid, Part I, pages 228 to 232, and Britain et al, *Journal Applied Polymer Science* 4, pages 207 to 211, 1960. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. The preferred group of said organometallic derivatives is that derived from tin. Examples of this preferred group are: dibutyltin diacetate, dibutyltin dilaurate, stannous octoate, stannous oleate, and the like.

At east one halogenated hydrocarbon is employed as the "essential blowing agent" in the foam forming composition of the present invention. As used herein the term "essential blowing agent" is intended to denote that this agent is necessary to achieve the blowing of the foam. Thus, it is within the scope of the present invention to employ small amounts of supplementary blowing agents so long as the principal or essential blowing function is achieved using at least one halogenated hydrocarbon. For example, as has been discussed above, small amounts of water of no more than 2 weight percent based upon the total weight of the foam formulation can be employed, and this water will provide carbon dioxide to assist in the blowing function. However, in a preferred embodiment of the present invention essentially all of the blowing is provided by the halogenated hydrocarbon, more preferably the halogenated hydrocarbon is the sole blowing agent. Examples of useful halogenated hydrocarbons include monofluorotrichloromethane, difluorodichloromethane, 1,1,2-trichloro-1,2,2-trifluoroethane, 1-chloro-1,1-difluoro-2,2-dichloroethane, 1,1-dichloro-1-fluoroethane, methylene chloride, chloroform, carbon tetrachloride, and mixtures thereof. The preferred blowing agent is monofluoro-trichloromethane. Generally speaking, the amount of blowing agent employed depends upon the desired density. Thus, if low density foams, i.e., 1.0 to 6 pounds per cubic foot, are desired, the amount of halogenated-hydrocarbon blowing agent is between about 5 and about 25 percent by weight based on the total weight of the composition. Preferably, the halogenated-hydrocarbon blowing agent comprises between about 10 and about 20 weight percent based on the weight of the composition.

Optional additives such as dispersing agents, cell stabilizers, surfactants, flame retardants, and the like, which are commonly employed in the fabrication of polymer foams, can be employed in the process of the invention. For example, the well-known phosphorus-based flame retardant additives may be used if flame retardancy is desired. These phosphate additives generally do not adversely affect the physical properties of the foam even if they are hydrolyzed and/or physically removed from the foam since these additives are not part of the foam backbone. As another illustration, a finer cell structure may be obtained if organosilicone polymers are used as surfactants in the reaction mix. Organosilicone polymers obtained by condensing a polyalkoxypolysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture. If used, the surfactant is preferably employed in an amount of between about 0.2 and about 5.0 weight percent based on the weight of the composition.

Other optional additives, such as inorganic and organic fillers, can be employed in the process of this invention. Illustrative inorganic fillers are calcium carbonate, silica, glass, antimony oxides, etc. Illustrative organic fillers are the various polymers, copolymers of vinyl chloride, vinyl acetate, acrylonitrile, styrene, melamine, partially oxyalkylated melamine, etc. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

The foams made in accordance with the present invention are generally rigid, although semi-rigid and flexible foams are also intended to be within the scope of the invention. The cellular foams made in accordance with the present invention generally have a density of between about 0.5 and about 6 pcf, preferably between about 1 and about 3 pcf.

The cellular products of the invention can be employed for all the purposes for which the currently produced cellular products are conventionally employed, but as noted above are particularly suitable for applications where higher hydrolysis resistance is required.

The following examples are intended to illustrate, but in no way limit, the scope of the present invention.

EXAMPLE 1

PREPARATION OF OPEN-CELL POLYURETHANE FOAMS WITHIN THE SCOPE OF THE PRESENT INVENTION AND COMPARISON OF THE PHYSICAL PROPERTIES THEREOF

Several open-cell polyurethane foams within the scope of the present invention were typically prepared as follows:

A sucrose-diethanolamine-based ethoxylated polyol (POLY-G 70-460, a product of Olin Corporation) in an amount of 100 parts by weight was blended at room temperature with 45 parts of trichlorofluoromethane blowing agent (Fluorocarbon R-11B, a product of E. I. DuPont de Nemours & Company, Inc.). Into the polyol and the blowing agent blend was added 2 parts by weight of a silicone surfactant (Q2-5125, a liquid product of Dow Chemical Corporation) and 0.5 parts by weight of DMEA (dimethylethanolamine, a product of Air Products, Inc.). To this blend (or so called "B-side") was charged 115 g of PAPI-135, polymeric isocyanate, a product of Dow Chemical Company. After thorough mixing, the resulting reaction mixture was poured into a box mold and allowed to free rise and cure at room temperature, thereby producing an open-cell rigid polyurethane foam (see FOAM I in TABLE I below).

The physical properties of several foams prepared in accordance with the above procedure, but utilizing components in the amounts specified in TABLES I through III, are given in TABLES I through III below.

TABLE I

FORMULATIONS AND PHYSICAL PROPERTIES FOR VARIOUS OPEN-CELL POLYURETHANE FOAMS

| Foam Formulation Components (in Weight Percent Based Upon Total Formulation) | Comparison Foam A | Foam 1 | Foam 2 | Foam 3 |
|---|---|---|---|---|
| POLY-G 71-530[1] | 35.83 | — | — | — |
| POLY-G 70-460[2] | — | 38.10 | 39.53 | 40.48 |
| Q2-5125[3] | 0.72 | 0.76 | 0.79 | 0.81 |
| Fluorocarbon R-11B[4] | 13.48 | 17.14 | 14.23 | 12.15 |
| Dimethylethanol-amine[5] | — | 0.19 | — | — |
| PAPI-135[6] | 49.08 | 43.81 | 45.45 | 46.56 |
| POLYCAT-8[7] | 0.89 | — | — | — |
| Foam Physical Properties | | | | |
| Density, pcf. | 2.00 | 1.57 | 1.96 | 2.25 |
| Open cell | No | YES | YES | YES |

[1] A sucrose-amine based polyol having a hydroxyl number of 530, an average molecular weight of 476, and average hydroxyl functionality of 4.5, and less than 5 percent of primary hydroxyl groups based upon the total number of hydroxyl groups in the polyol. This is a product of Olin Corporation.
[2] An oxyethylated sucrose-diethanolamine-based polyol having a hydroxyl number of 460, an average molecular weight of 550, and average hydroxyl functionality of 4.5, a viscosity of 2,000 cps at 25° C., and 90 percent of primary hydroxyl groups based upon the total number of hydroxyl groups in the polyol. This is a product of Olin Corporation.
[3] A silicone surfactant, a product of Dow Chemical Company.
[4] A trichlorofluoromethane blowing agent, a product of E. I. DuPont de Nemours and Company, Inc.
[5] A dimethylethanolamine (DMEA) catalyst, a product of Air Products, Inc.
[6] A polyisocyanate having an isocyanate equivalent weight of 135, a product of Dow Chemical Company used herein at a 105 Isocyanate Index.
[7] An N,N'—dimethylcyclohexylamine catalyst, a product of Abbott Laboratories.

TABLE II

FORMULATIONS AND PHYSICAL PROPERTIES FOR VARIOUS OPEN-CELL POLYURETHANE FOAMS

| Foam Formulation Components (in Weight Percent Based Upon Total Formulation) | Foam 4 | Foam 5 | Foam 6 |
|---|---|---|---|
| POLY-G 70-460[2] | 37.74 | 38.61 | 39.53 |
| Q2-5125[3] | 0.75 | 0.77 | 0.79 |
| Fluorocarbon R-11B[4] | 18.11 | 16.22 | 14.23 |
| Mondur MR[8] | 43.40 | 44.40 | 45.45 |
| Foam Physical Properties | | | |
| Air Flow in SCFM** | | | |
| parallel to rise | 8 | 4.0 | 3.8 |
| perpendicular to rise | 3.7 | 1.25 | 1.8 |
| Density, pcf. | 1.61 | 1.79 | 2.00 |
| Open Cell | YES | YES | YES |

**Standard cubic feet per minute.
For footnotes [2], [3], and [4] see TABLE I.
[8] A polymeric isocyanate, a product of Mobay Chemical Company, used herein at a 105 Isocyanate Index.

TABLE III

FORMULATIONS AND PHYSICAL PROPERTIES FOR VARIOUS OPEN-CELL POLYURETHANE FOAMS

| Foam Formulation Components (in Weight Percent Based Upon Total Formulation) | Foam 7 | Foam 8 | Foam 9 | Foam 10 |
|---|---|---|---|---|
| POLY-G 70-460[2] | 30.78 | 33.40 | 35.78 | 38.17 |
| POLY-G 55-28[9] | 6.59 | 4.18 | 1.99 | — |
| POLY-G 76-120[10] | 6.59 | 4.18 | 1.99 | — |
| Q2-5125[3] | — | — | — | 0.76 |
| L-5307[11] | 0.88 | 0.83 | 0.79 | — |
| Dimethylethanol-amine[5] | 0.22 | 0.21 | 0.20 | — |
| Fluorocarbon R-11B[4] | 17.14 | 17.12 | 17.10 | 17.18 |
| PAPI-135[6] | 37.80 | 40.08 | 42.15 | 43.89 |
| Foam Physical Properties | | | | |
| Air Flow | Fair | Good | Very Good | Excellent |
| Open Cell | YES | YES | YES | YES |

For footnotes [2], [3], [4], [5], and [6], see TABLE I.
[9] An oxyalkylated diol having a hydroxyl number of 28, an average molecular weight of about 4,000, an average hydroxyl functionality of 2.0, and a primary hydroxyl content of 85 percent based upon the total number of hydroxyl groups in the polyol. This is a product of Olin Corporation.
[10] A glycerol-based polyol having a hydroxyl number of 120, an average molecular weight of about 1,400, and average hydroxyl functionality of 3, a primary hydroxyl content of 55 percent based upon the total number of hydroxyl groups in the polyol, and a viscosity of 450 cps at 25° C. This is a product of Olin Corporation.
[11] A silicone surfactant, a product of Union Carbide.

The results as presented in TABLES I through III above demonstrate that open-cell rigid urethane foams can be provided at various foam densities using foam forming compositions of the present invention. For example, the formulations used to fabricate FOAMS 1, 2, and 3 as detailed in TABLE I provide open-cell foams having densities of 1.57, 1.96, and 2.25 pcf, respectively. Each of these foam formulations contained a polyol having a primary hydroxyl content of 90 percent based upon the total hydroxyl content of the polyol used therein (POLY-G 70-460). In contrast, the formulation used to fabricate Comparison Foam A contained a polyol having a primary hydroxyl content of less than 5 percent based upon the total hydroxyl content of the polyol (POLY-G 71-530), and the resulting foam was closed cell.

The results as given in TABLE II above demonstrate the inverse relationship between the amount of fluorocarbon blowing agent employed in the formulations for making FOAMS 4, 5, and 6, and the densities of the foams fabricated from these formulations. Note that as the amount of fluorocarbon was decreased from about 18 weight percent of the formulation for FOAM 4 down to about 14 percent of the formulation for FOAM 6, the corresponding foam density was increased from about 1.6 to about 2.0 pcf. Each of FOAMS 4, 5, and 6, was open cell as clearly demonstrated by the air flow values parallel and perpendicular to the rise of these foams.

TABLE III provides data on foams prepared from polyol blends wherein the individual polyols have different primary hydroxyl contents. The primary hydroxyl content of POLY-G 55-28 and POLY-G 76-120 is lower than that of POLY-G 70-460 as shown by the values given in footnotes (9), (11), and (2), respectively. The ratio of POLY-G 70-460 to POLY-G 55-28 to POLY-G 76-120 was varied from 70/15/15 to 80/10/10 to 90/5/5 to 100/0/0 for formulations used to fabricate FOAMS 7, 8, 9, and 10 respectively.

The results as given in TABLE III demonstrate that as the total average primary hydroxyl content of various polyol blends is increased by decreasing the quantities of the lower primary hydroxyl content polyols (POLY-G 55-28 and POLY-G 76-120) from 6.59 weight percent each (formulation for FOAM 7) to zero weight percent each (formulation for FOAM 10), the open cell character of the resulting foams as determined by air flow through each foam is enhanced.

What is claimed is:

1. An essentially water-free composition useful for fabricating an open-cell polyurethane foam comprising:
   (a) an ethoxyl end-capped or fully ethoxylated phosphorus-free polyether polyol having an average hydroxyl functionality of between 2 and 8 and containing at least 60 percent of primary hydroxyl groups based upon the total number of hydroxyl groups in said polyol, said polyol having a molecular weight of between about 150 and about 15,000,
   (b) a polyisocyanate having an isocyanate equivalent weight of between about 80 and about 160,
   (c) a polyurethane-forming catalyst in a catalytically effective amount or in an amount of zero if said polyol is auto-catalytic, and
   (d) at least one halogenated hydrocarbon as an essential blowing agent in the composition,
said polyol being present in said composition in an amount of between about 0.5 and about 1.2 equivalents of said polyol per equivalent of said polyisocyanate.

2. The composition of claim 1 wherein said halogenated-hydrocarbon blowing agent is selected from the group consisting of monofluorotrichloromethane, difluorodichloromethane, 1,1,2-trichloro-1,2,2-trifluoroethane, 1-chloro-1,1-difluoro-2,2-dichloroethane, 1,1-dichloro-1-fluoroethane, methylene chloride, chloroform, carbon tetrachloride, and mixtures thereof.

3. The composition of claim 1 wherein said polyol is prepared by reacting an alkylene oxide with an active-hydrogen containing compound, said active-hydrogen containing compound being selected from the group consisting of polyhydric compounds, polyamines, and mixtures thereof.

4. The composition of claim 1 wherein said polyisocyanate is selected from the group consisting of toluene diisocyanate, polyarylene polyisocyanate, polymethylene polyphenyl isocyanate, methylene-bis-(4-phenyl isocyanate), and mixtures thereof.

5. The composition of claim 1 wherein said composition additionally contains a surfactant.

6. The composition of claim 1 wherein said catalyst is a tertiary amine catalyst.

7. A method of producing an essentially urea-free, open-cell polyurethane foam by reacting an essentially water-free composition comprising an ethoxy end-capped or fully ethoxylated, phosphorus-free polyether polyol having a hydroxyl functionality of between 2 and 8 and containing at least 60 percent of primary hydroxyl groups based upon the total hydroxyl functionality in said polyol with a polyisocyanate having an isocyanate equivalent weight of between about 80 and about 160 in the presence of a polyurethane-forming catalyst and, as an essential blowing agent, at least one halogenated hydrocarbon blowing agent.

8. The method of claim 7 wherein said halogenated hydrocarbon blowing agent is selected from the group consisting of monofluorotrichloromethane, difluorodichloromethane, 1,1,2-trichloro-1,2,2-trifluoroethane, 1-chloro-1,1-difluoro-2,2-dichloroethane, 1,1-dichloro-1-fluoroethane, methylene chloride, chloroform, carbon tetrachloride, and mixtures thereof.

9. The method of claim 7 wherein said polyol is prepared by reactng an alkylene oxide with an active-hydrogen containing compound, said active-hydrogen containing compound being selected from the group consisting of polyhydric compounds, polyamines, and mixtures thereof.

10. The method of claim 7 wherein said polyisocyanate is selected from the group consisting of toluene diisocyanate, polyarylene polyisocyanate, polymethylene polyphenyl isocyanate, methylene-bis(4-phenyl isocyanate), and mixtures thereof.

11. The method of claim 7 wherein said composition additionally contains a surfactant.

12. The method of claim 7 wherein said catalyst is a tertiary amine catalyst.

13. The polyurethane foam produced by the method of claim 7.

14. The polyurethane foam produced by the method of claim 8.

15. The polyurethane foam produced by the method of claim 9.

16. The polyurethane foam produced by the method of claim 10.

17. The polyurethane foam produced by the method of claim 11.

18. The polyurethane foam produced by the method of claim 12.

* * * * *